Figure 1:
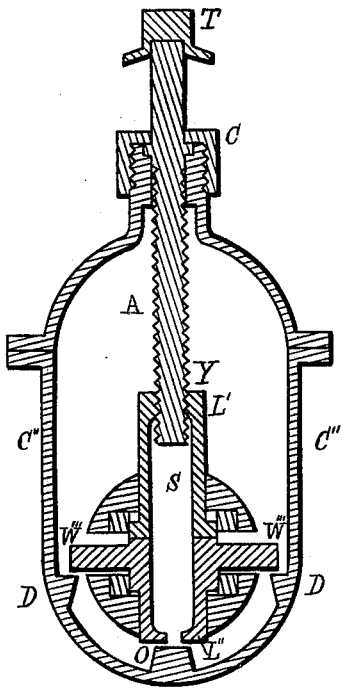

2 Sheets—Sheet 1.

H. G. LUDLOW & J. WARD.
Slide-Valve.

No. 208,687. Patented Oct. 8, 1878.

Witnesses:
Charles S. Brintnall
Bernard Blair

Inventors:
Henry G. Ludlow
John Ward
by W. E. Hagan
attorney

2 Sheets—Sheet 2.

H. G. LUDLOW & J. WARD.
Slide-Valve.

No. 208,687. Patented Oct. 8, 1878.

Witnesses:
Charles S. Brintnall
Bernard Blair

Inventors:
Henry G. Ludlow
John Ward
by W. E. Hagan
attorney

N. PETERS, PHOTO-LITHOGRAPHER, WASHINGTON, D. C.

UNITED STATES PATENT OFFICE.

HENRY G. LUDLOW, OF TROY, AND JOHN WARD, OF LANSINGBURG, ASSIGNORS TO THE LUDLOW VALVE MANUFACTURING COMPANY, OF LANSINGBURG, NEW YORK.

IMPROVEMENT IN SLIDE-VALVES.

Specification forming part of Letters Patent No. 208,687, dated October 8, 1878; application filed April 22, 1878.

*To all whom it may concern:*

Be it known that we, HENRY G. LUDLOW, of the city of Troy, county of Rensselaer and State of New York, and JOHN WARD, of the village of Lansingburg, same State and county, have invented an Improvement in Double-Gate Slide-Valves, of which the following is a specification:

Our invention relates to such double-gate slide-valves as are made to operate by means of a stem, which communicates a vertical and lateral motion to the gate-disks, to open and close the entry and discharge ports.

Our invention consists in a manner of arranging an inclosure upon and between the opposite backs of the gate-disks to receive two intervening vertical wedges, one of which is threaded to the stem by means of an upwardly-projecting shank, and the other wedge arranged with a downwardly-projecting shank, and both of which wedges are actuated by the stem and a stop or stops formed upon the interior of the valve-case, so as to force the gate-disks laterally toward their seats.

Our invention also consists in a manner of arranging lateral guides or slides upon and between the interlocking disk-gates, so that the latter shall have a guided lateral motion toward and from their port-seats when being opened and closed.

Our invention also consists in arranging between and upon the backs of two interlocking valve disk-gates two engaging vertical wedges, one of which is attached to the stem by means of a threaded shank which passes through and out of the disk-chamber wall, having one inner inclined wedging-surface, and upon its reverse side one straight surface parallel to and in contact with the back of one of the disk-gates, with the other the lower engaging-wedge projected upwardly, having two wedging-surfaces, one of which is arranged parallel to and so as to engage by contact the wedging-surface of the upper descending wedge, and the other wedging-surface of the lower wedge being formed upon the reverse side, so as to engage by contact an incline upon the inner face of one of the disk-gates, the lower wedge having a rounded shank formed upon its base, which passes through the disk-chamber wall, so as to engage by contact, when forced downward, an upwardly-projecting stop arranged upon the bottom of the inside of the case-wall, to arrest the descent of the wedging parts, and so as to cause them to engage by contact, and spread the disk-gates apart and toward their closing seats.

Our invention also consists in combining upon and between the backs of two sliding-valve disk-gates two vertical wedges, one of which is attached to the stem by means of a threaded shank which passes through and out of the disk-chamber wall, having a slide-bearing formed between the two disks, with this upper wedge having one inner inclined wedging-surface, and upon its reverse side one straight surface parallel to and in contact with the back of one of the disk-gates, with the other the lower engaging-wedge projected upwardly, and having two wedging-surfaces, one of which is arranged parallel to and so as to engage by contact the wedging-surface of the upper descending wedge, and the other wedging-surface of the lower wedge being formed upon the reverse side, so as to engage by contact an incline upon the inner face of one of the disk-gates, with arms projected from the sides of the lower wedge through the disk-chamber wall, and so as to engage by contact two stops arranged opposite each other upon the interior of the case-wall, to arrest the descent of the wedging parts when forced down by the stem, and cause the disk-gates to separate and move laterally to their seats.

In the accompanying drawing there are seven figures illustrating our invention, in all of which like letters are applied to designate the same parts.

Figure 2:
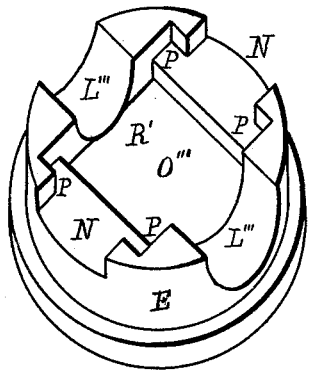
Figure 3:
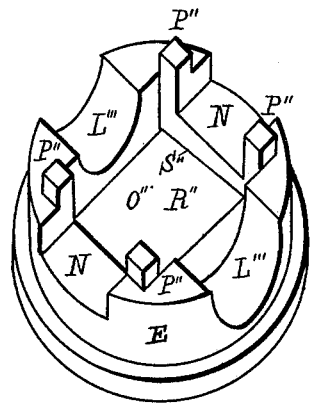
Figure 4:
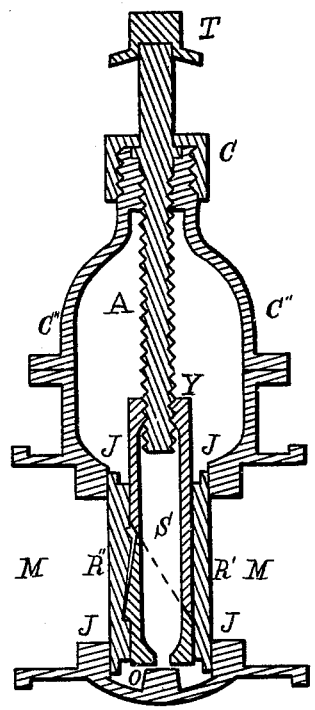
Figure 5:
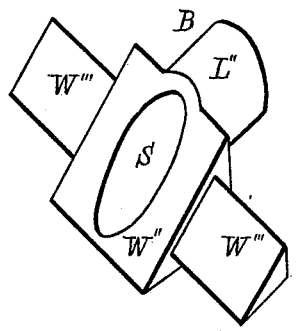
Figures 6, 7:
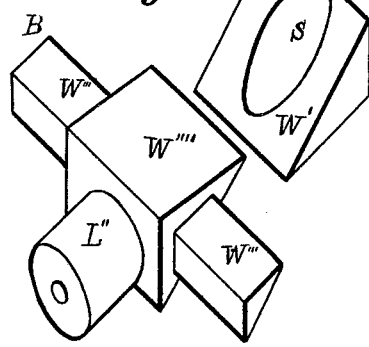

Figure 1 exhibits a vertical sectional view of a slide-valve, taken on a line parallel to the face of the gate-disks, showing the manner of connecting the wedges by means of the stem, and the position of the wedges and the chamber inclosing them formed between the disk-gates. It also exhibits the stops formed upon the inside of the case-wall, and the arms projected laterally from the lower wedge, and the hollow shanks upon both the upper and lower wedges, through which the threaded stem passes. Figs. 2 and 3 show the gate-disks separated and in perspective, and the manner of forming the chamber between them to receive the wedges, with openings for the projecting shanks, side arms, and also the interlocking guides to regulate the lateral motion of the gate-disks. Fig. 4 illustrates a vertical section of the valve, taken through the center on a line at right angles to the disk-gates, showing the vertical wedges and the manner of actuating them by means of the threaded stem; also, the disk-gates in section, and their position as regards their port-seats and the wedges. Fig. 5 exhibits the lower wedge and shank, in perspective, upon one of its sides; and Fig. 6 illustrates the same shown upon a side reverse to that shown in Fig. 5, and in connection with Fig. 7, which is a view, in perspective, of the upper wedge and shank, and the two wedges separated to show their parallel lines of engaging wedging-surfaces.

The several parts and factors which compose our invention, and by which it is made operative as applied to a double-gate slide-valve, are designated by letter-reference, as follows: The valve-case is shown at C″ C″, the stem at A, the upper wedge at W′, and its shank at L′, the lower wedge at W″, and both of the wedges, as pierced for the passage of the stem, at S. The shank of the lower wedge is shown at L″, and the valve-stem, as threaded to the shank of the upper wedge, at Y. The side arms of the lower wedge are designated at W‴ W‴, and the back wedging-surface of the lower wedge at W″″. The gate-disk seats are shown at J J J J, the side stops formed on the interior of the case-wall at D D, and the lower upwardly-projected stop at O. The wall inclosing the disk-chamber, which is cut out for the slide-bearings of the shanks and the side arms, is designated at E E, the stem-cap at C, and the nut upon the stem at T.

When the disk-gates, as shown in Figs. 2 and 3, are placed back to back, with the gate sides of the disks facing their closing seats, and so that the projections P″ P″ P″ P″ enter the corners P P P P, there is formed the inclosure O″ O″ between the gates and upon their backs, and having the passages through the inclosure-wall shown at L‴ L‴, which serve as guides for the vertical shanks attached to the upper and lower wedges. At N N are formed, in the side of the disk-chamber, passages for the side arms of the lower wedge. At Fig. 3 the inner wall of the chamber shown at S″ is inclined or beveled, so as to engage in wedging contact the outside of the lower wedge, W″, which is shown as inclined at W″″, Fig. 6.

The operation of the combined parts and factors is as follows: When the threaded valve-stem is screwed in, it forces the upper wedge downward and until its inclined surface has engaged the parallel surface of the lower wedge, the stem passing through the space in the center of the shanks and wedges, and the lower wedge descending until the stops in the side and the one at the bottom (when both are used) arrest its downward motion, when the wedging-surfaces spread out laterally and force the disk-gates toward their seats, the gates being guided laterally by the interlocking points P″ P″ P″ P‴, and the shanks of the wedges being arranged to have some play in the passages L‴ L‴ for freedom of motion.

While we have illustrated arms formed upon the sides of the lower wedge, with engaging-stops upon the side of the case-wall to actuate the lateral action of the wedges, and for the same use a stop upon the bottom of the case-wall to arrest by contact the descent of the lower wedge-shank, either of the two means employed for this purpose may be used separately to produce a like result, as well as when employed together.

While we have shown the lower wedge as having two wedging and inclined surfaces, the incline upon the back of the wedge and the corresponding one formed upon the disk-gate may be omitted, and the lower wedge in that respect made to correspond with the upper one, where the back is in contact with the disk.

Having thus described our invention, what we claim, and desire to secure by Letters Patent, is—

1. In a double-gate slide-valve, two vertical wedges, having their inner wedging-surfaces in parallel engaging contact, and their backs in contact with the gate-disks, and both arranged between the latter, with the wedges pierced for the passage of the stem, and each of them provided with a hollow shank, and a slide-bearing formed between the disks, and the upper wedge threaded to the stem, and the lower wedge provided with side arms which project beyond the edges of the disks, and so as to engage by contact stops formed upon the inside of the case-wall, that arrest the descending parts, and cause the wedging-surfaces to force the disks laterally toward their seats, as herein shown and described.

2. In a double-gate slide-valve, two vertical wedges having their inner wedging-surfaces in parallel engaging contact, and their backs in contact with the gate-disks, and both arranged between the latter, with the wedges and attached shanks pierced for the passage of the valve-stem, and having a slide-bearing formed between the disks, and the upper wedge threaded to the stem, with an upwardly-projecting stop arranged in the bottom of the valve-case interior, which, by engaging contact, arrests the descending parts when actuated by the stem to spread the disks laterally toward their seats, as shown and described.

3. In a double-gate slide-valve, to guide the lateral motion of the disks when forced toward their seats, the projecting points P″ P″ P″ P‴, formed upon one of the disks, and the interlocking corners P P P P, formed upon the other, as shown and described.

4. In a double-gate slide-valve, the combination of the stem A, the upper wedge, W', and threaded shank L', the lower wedge, W'', and shank L'', the gates R' and R'', and opening S', with the side arms, W''' W''', attached to the lower wedge, the side stops, D D, formed in the side of the case-wall, and the stop O, formed in the bottom, arranged to operate as herein shown, and as described.

Signed at Troy, New York, this 20th day of April, 1878.

HENRY G. LUDLOW.
    JOHN WARD.

Witnesses:
 JOHN H. HAWKINS,
 WILLIAM S. VAN VLECK.